United States Patent Office 3,562,319
Patented Feb. 9, 1971

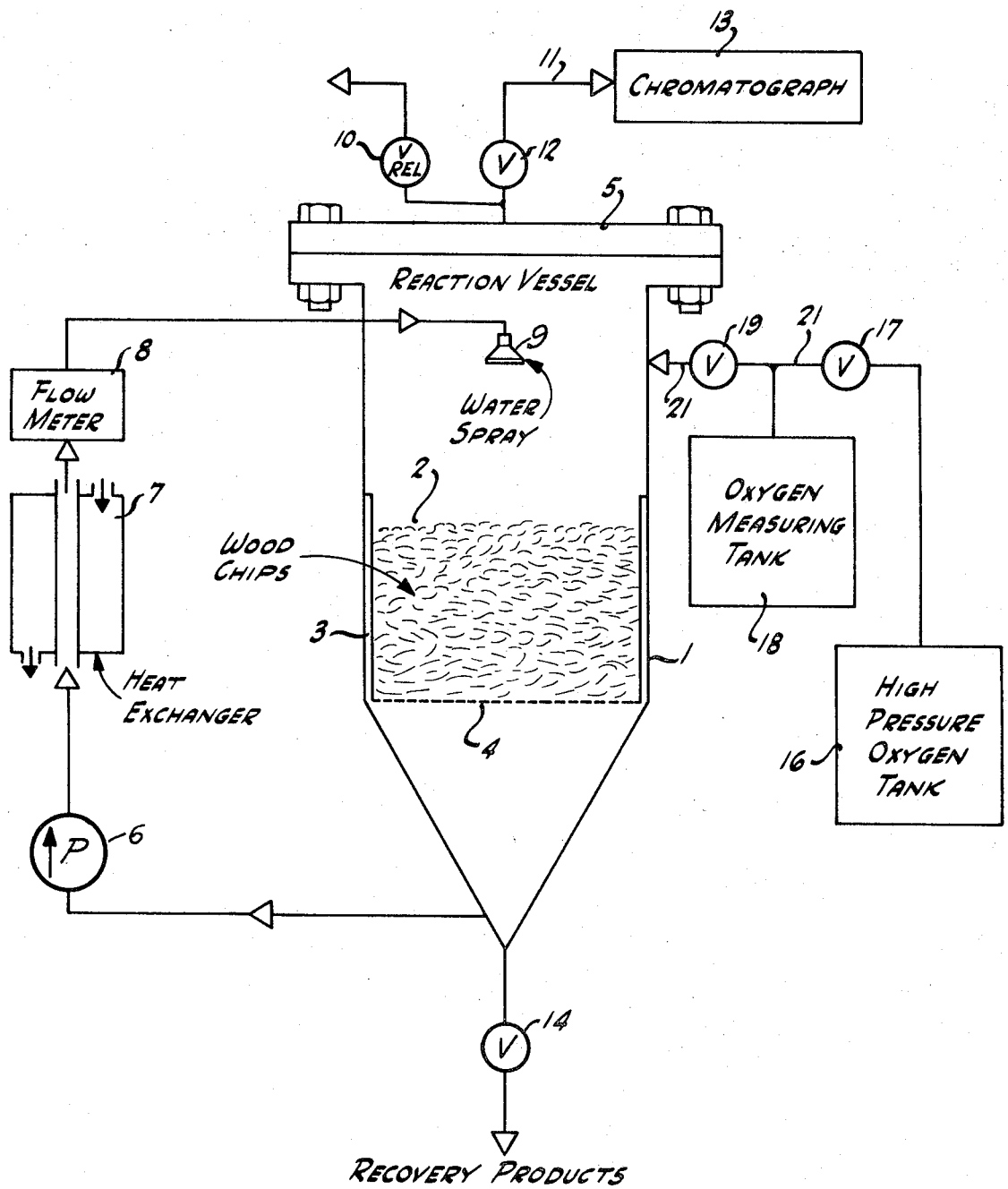

3,562,319
OXIDATION OF CELLULOSIC MATERIAL TO PRODUCE ORGANIC ACIDS
David L. Brink, Berkeley, Calif., assignor to The Regents of the University of California
Filed June 20, 1966, Ser. No. 558,747
Int. Cl. C07c 51/18
U.S. Cl. 260—528    8 Claims

ABSTRACT OF THE DISCLOSURE

Cellulosic material is oxidized under elevated pressure and temperature, by oxygen in an aqueous medium under acidic conditions inherently resulting from the acids liberated from the material. Organic acids are thus directly produced from the material by such oxidation. Wood residue is economically disposed of by the process without creating smog or smoke problems.

DISCLOSURE

This invention relates to the oxidation of cellulosic material, including lignin containing cellulosic material, and to the resultant production of various common organic acids therefrom; and more particularly, to the oxidation of lignin containing wood residues which are normally waste products at mill sites, such as sawdust, shavings, wood chips, and bark.

At lumber mills, there is a problem in the disposal of normally waste wood residues which are usually burned to dispose of the same. The smog created by disposal of these materials in refuse burners pollutes the air in wide areas, and creates a problem which threatens to shut down facilities in the future unless other means of disposal are developed. The prevent invention overcomes such problem, and at the same time provides a simple and smooth economical method for obtaining organic acids from the wood by oxidation thereof under acidic conditions inherently resulting from the oxidation. Heretofore, it has been known that by-product constituents can be obtained by the oxidation of wood or similar cellulosic material under alkaline conditions. This requires careful control of the alkalinity, and the expense entailed in the use of alkalis. Moreover, under alkaline oxidative conditions, namely, at a pH greater than 7.0, there is considerable expense in constructing and operating facilities to free the resultant salts of organic acids by acidification with strong mineral acids, as the organic acids are not directly produced.

Summarizing the invention, it has been found unexpectedly that the cellulosic material can be consumed by oxidation in an aqueous medium under an elevated temperature and pressure and under natural or inherent acid conditions dependent only upon the acids liberated from the cellulosic material by the oxidation of the material. Thus, the resultant aqueous medium can be economically processed directly for free acids. The procedure does not require addition of alkali buffering agents or catalysts but they may be employed while still maintaining the reaction vehicle on the acid side, desirably advantageously below a pH of 6.0. All that need be done is to subject the cellulosic material in an aqueous medium to oxygen in an amount sufficient to maintain oxidation, or in place thereof, air, and under elevated temperatures and pressures for time periods which may vary widely, to produce directly various organic acids, such as formic, acetic, glycolic, oxalic, succinic, lactic, and levulinic.

From the preceding, it is seen that the invention has as its objects, among others, the provision of an improved, simple and economical process not requiring the addition of catalysts, buffering agents or alkalies wherein cellulosic material can be oxidized under inherent acidic conditions in an aqueous medium, thus enabling the resultant aqueous reaction vehicle to be processed directly for free organic acids, and which can be economically employed for the disposal of normally waste wood residue without creating a smog or smoke problem. Other objects of the invention will become apparent from the following more detailed description and accompanying drawing which is a schematic view in the nature of a flow sheet, of a conventional type of apparatus in which the process can be conducted.

In greater detail, the process is applicable to any type of cellulosic material, including those containing lignin, such as straw and bagassé, and is advantageously applicable to wood. The reaction is conducted in a digester in an aqueous vehicle and at an elevated temperature and pressure merely by continuously effecting flow of oxygen or air into the digester while maintaining the vehicle under its natural acidic conditions which will normally vary from about pH 1.0 to 3.0 but may vary from about pH 1.0 to 4.0 depending on reaction conditions. If air is used in place of oxygen, about five times more air will be required under given conditions than oxygen. Oxygen, however, is more convenient to use because of greater partial pressure in the reaction vessel at any given total pressure but insofar as the principle of the invention is concerned, air can be used in place of oxygen; and the term "oxygen" herein is, therefore, to be construed as including air.

The temperature is relatively immaterial but desirably should vary from about 120° C. to 350° C. with a total pressure range of about 75 to 1,000 pounds per square inch gauge (p.s.i.g.). However, the higher pressure ranges involve use of more expensive equipment to withstand such pressure. The water to cellulosic material ratio may vary from about 2½ to 1 to 10 to 1, and conveniently about 6 to 1, but again this is not particularly critical; and it is immaterial whether or not the chips are submerged. The time of reaction will usually vary from about 10 minutes to 6 hours. The higher the temperature and/or pressure conditions, the shorter the time and vice versa.

Oxygen can be introduced into the reaction vessel at any desirable rate as long as sufficient oxygen is present to maintain oxidation of the cellulosic material. The reaction can be conducted and the rate of flow of oxygen maintained to the point where all the cellulosic material is consumed by such oxidation, or it can be stopped at any intermediate point. In principle, the process resides in oxidizing the cellulosic material in an aqueous medium under natural acidic conditions, in a digester at an elevated temperature and pressure; sufficent oxygen being continuously added to support such oxidation and solubilize the cellulosic material.

The process can be conducted as a batch process or as a continuous process; and if alkaline buffering agents are added, such as alkaline or alkaline earth hydroxides, carbonates, bicarbonates and phosphates, they should not be added to the point where the pH exceeds about 6.0. The reaction proceeds exothermically but external heat may be applied if the heat generated by the exothermic reaction in the digester is insufficient to maintain desired temperature conditions. Without addition of alkali buffering agents, the pH of the reaction vehicle will automatically vary from about pH 1.0 to pH 4.0; and it is advantageous and more economical to conduct the reaction under such conditions.

The following is a typical example of the process of this invention with reference to the accompanying schematic drawing which illustrates a conventional batch type apparatus in which the reaction is conducted, comprising a reaction vessel 1 adapted to hold wood chips 2 in a tank 3 having a perforated bottom 4; the vessel being provided with the usual removable flanged cover 5. Sufficient water, desirably within the image noted previously, is initially placed in the digester, and while the reaction proceeds exothermically, the aqueous reaction vehicle is continuously circulated by means of pump 6, through heat exchanger 7 to which external heat or cooling medium are applied as required to maintain a desired temperature.

From the heat exchanger the reaction vehicle is continuously conducted through a conventional flow meter 8 to a conical water spray 9 which continuously sprays the aqueous medium onto substantially the entire top surface of the chips. A pressure relief valve 10 is provided to vent gases; and a pipe line 11 having valve 12 is connected to the reaction vessel for conducting, from time to time when valve 12 is opened, gas samples to a conventional gas chromatograph 13 for periodically quantitatively determining nitrogen, oxygen, carbon monoxide and carbon dioxide to enable determination of reaction conditions.

The bottom of vessel 1 is provided with a valve 14 which when opened allows withdrawal of the reaction vehicle from the vessel. After such withdrawal, the reaction vehicle containing organic acid recovery products, can be conducted to any conventional processing apparatus for isolating the various acids by conventional procedures.

Oxygen is continuously introduced into the system from oxygen tank 16 equipped with a valve 17 to control the flow of oxygen as desired; and a conventional oxygen measuring tank 18 for determining the amount of oxygen supplied, is connected between valve 17 and another valve 19 which is connected by line 21 to the reaction vessel.

In the example under discussion, the digester was charged with 12,000 grams of water, and 2,000 grams (oven dry basis) of conventional white fir wood chips of about ⅝" average length along the grain, a cross grain thickness of about ⅛" to ¼" and a variable width up to about 1.0". The reaction was continuously conducted at a temperature of 150° C. at 100 pounds per square inch partial oxygen pressure, with a total pressure not exceeding 300 pounds per square inch (p.s.i.g.). External heat was applied as needed to heat exchanger 7 to maintain the desired temperature conditions of about 150° C. The following Table I indicates the total amount of oxygen added at the end of 1, 2, 3 and 4 hours, in liters at standard temperature and pressure conditions (STP), also the amount of oxygen consumed at the end of each of the periods mentioned, and the pH of the reaction vehicle. In this connection, the amounts of oxygen are cumulative.

TABLE I

| End of time period in hours: | Oxygen added STP, liters | Oxygen consumed STP, liters | pH |
| --- | --- | --- | --- |
| 1 | 282.0 | 168.8 | 2.8 |
| 2 | 436.5 | 326.4 | 2.2 |
| 3 | 581.9 | 458.1 | 2.0 |
| 4 | 766.7 | 610.5 | 1.9 |

At the end of four hours and after about 20 minutes when the reaction vehicle had reached ambient conditions, it was determined by empirical weighing in the substantially dry state that 980 grams of wood had been consumed.

Table II below indicates the yields in grams of various organic acids which were obtained at the ends of the periods noted in Table I. From this table, it will be observed that as the reaction proceeded, the yields of the formic, acetic, glycolic and lactic acids increased, while those of the other acids reached maximums at intermediate times due to greater rate of degradation than of formation.

TABLE II

Yield of acids in grams at end of times (hours)

| | 1 | 2 | 3 | 4 |
| --- | --- | --- | --- | --- |
| Formic | 44.5 | 106.7 | 134.6 | 174.9 |
| Acetic | 25.4 | 41.2 | 48.4 | 50.8 |
| Glycolic | 11.2 | 24.6 | 39.0 | 46.8 |
| Oxalic | 7.4 | 17.1 | 13.1 | 5.2 |
| Succinic | 5.0 | 6.9 | 7.8 | 4.8 |
| Lactic | 0.5 | 1.3 | 2.2 | 2.4 |
| Levulinic | 1.2 | 1.8 | 2.4 | 1.4 |

Although the reaction was terminated at the end of four hours, it can be conducted until all the wood is consumed by oxidation to completely dispose of the same.

I claim:

1. The method of consuming cellulosic material and producing organic acids directly therefrom without subsequent acidification which consists essentially in oxidizing such cellulosic material with oxygen in an amount sufficient to maintain oxidation of said material and in an aqueous medium at an elevated pressure and temperature, and under acidic conditions inherently resulting from acids liberated from said material by such oxidation.

2. The method of claim 1 wherein the cellulosic material is wood residue.

3. The method of claim 1 wherein the pH is below about 6.0.

4. The method of claim 1 wherein the oxidation is conducted in the absence of alkaline agents and at a pH of about 1.0 to 4.0.

5. The method of claim 1 wherein the temperature of the oxidation is between about 120° C. to 350° C.; the pressure of about 75 to 1,000 lbs. per sq. in.; the water to cellulosic material ratio about 2.5 to 1, to 10 to 1; the time of the reaction about 10 minutes to 6 hours; and the amount of oxygen is at least sufficient to maintain oxidation of said cellulosic material.

6. The method of claim 5 wherein the oxidation is conducted in the absence of alkaline agents and at a pH of about 1.0 to 4.0.

7. The method of claim 6 wherein the cellulosic material is wood residue.

8. The method of consuming lignin containing cellulosic material which consists essentially in oxidizing said material with oxygen gas in an aqueous medium maintained in a digester at an elevated pressure and temperature, continuously effecting flow of said oxygen into said digester in an amount sufficient to maintain oxidation, and simultaneously producing organic acids directly from said material under natural acidic conditions at a pH of about 1.0 to 4.0 inherently resulting from the organic acids liberated from said material by such oxidation without subsequent acidification, and in the absence of alkaline agents in said aqueous medium, thereby enabling free acids to be recovered directly from the resultant aqueous medium.

References Cited

UNITED STATES PATENTS

| 1,520,885 | 12/1924 | Rankin | 260—528 |
| 2,380,196 | 7/1945 | Soltzberg | 260—528 |
| 2,928,868 | 3/1960 | Grangaard | 260—528 |

OTHER REFERENCES

Heuser: The Chemistry of Cellulose, Wiley and Sons, New York (1944), pp. 456-7.

Brauns et al.: Chemistry of Lignin (Supplement volume), Academic Press, New York (1960), p. 500.

JAMES A. PATTEN, Primary Examiner